(12) United States Patent
Reynolds

(10) Patent No.: US 11,414,003 B1
(45) Date of Patent: Aug. 16, 2022

(54) LIGHTED GUIDE POST ASSEMBLY FOR BOAT TRAILER

(71) Applicant: Jonathan Reynolds, Fairhope, AL (US)

(72) Inventor: Jonathan Reynolds, Fairhope, AL (US)

( * ) Notice: Subject to any disclaimer, the term of this patent is extended or adjusted under 35 U.S.C. 154(b) by 0 days.

(21) Appl. No.: 17/235,892

(22) Filed: Apr. 20, 2021

Related U.S. Application Data

(60) Provisional application No. 63/012,677, filed on Apr. 20, 2020.

(51) Int. Cl.
*B60P 3/10* (2006.01)
*B60Q 1/30* (2006.01)

(52) U.S. Cl.
CPC ........... *B60P 3/1091* (2013.01); *B60Q 1/305* (2013.01)

(58) Field of Classification Search
CPC .............................. B60P 3/1091; B60Q 1/305
USPC .......... 280/414.1; 362/485, 222, 223, 249.02
See application file for complete search history.

(56) References Cited

U.S. PATENT DOCUMENTS

| 4,715,768 | A | 12/1987 | Capps |
| 7,017,933 | B2 | 3/2006 | Mickley |
| 7,628,519 | B2 | 12/2009 | Purdy |
| 8,303,145 | B2 | 11/2012 | Wilcox |
| 9,896,021 | B2 | 2/2018 | Speropoulos |
| 2003/0189836 | A1 | 10/2003 | Sparling et al. |
| 2005/0237755 | A1 | 10/2005 | Vause |
| 2008/0123362 | A1* | 5/2008 | Thorneycroft .......... F21V 21/13 362/558 |
| 2009/0194969 | A1* | 8/2009 | Bearey ................... B60D 1/36 116/28 R |
| 2014/0355243 | A1* | 12/2014 | Yu ........................ F21K 9/64 362/217.05 |
| 2016/0090028 | A1 | 3/2016 | Krejci |
| 2016/0178137 | A1* | 6/2016 | Jiang ................... F21V 19/009 362/221 |
| 2016/0347247 | A1* | 12/2016 | Espey ................... B60Q 1/52 |

OTHER PUBLICATIONS

U.S. Appl. No. 29/734,636, filed May 14, 2020, to Jonathan Reynolds.

* cited by examiner

*Primary Examiner* — Laura K Tso
(74) *Attorney, Agent, or Firm* — AdamsIP, LLC

(57) ABSTRACT

A lighted guide post assembly for a boat trailer is provided. The assembly includes a square tubular angled support post that attaches to a boat trailer, a translucent circular outer tube that covers the square support post, and strips of lights that suspend within the interior of the outer tube between the outer tube and the square support post. This arrangement allows the guide post to glow on four sides without light bleeding together from adjacent sides of the guide post.

19 Claims, 8 Drawing Sheets

LIGHTED GUIDE POST ASSEMBLY FOR BOAT TRAILER

CROSS REFERENCES

This application claims priority to U.S. Provisional Application No. 63/012,677, filed on Apr. 20, 2020, which application is incorporated herein in its entirety by reference.

FIELD OF THE DISCLOSURE

The subject matter of the present disclosure refers generally to lighted guide posts for centering a boat on a boat trailer.

BACKGROUND

Guide posts for boat trailers have become a common trailer accessory for aiding in centering a boat on a trailer when loading the boat onto the trailer at a back-down boat ramp. When loading a boat back onto a trailer, the boat is floating in a body of water while the trailer is partially submerged, thereby making much of the trailer invisible to the operator of the boat as the operator attempts to steer the boat onto the trailer in an accurately centered position on the trailer. A pair of opposing guide posts are attached to opposing sides of the trailer and extend upwardly above the surface of the water on either side of the trailer, thereby giving the operator of the boat visual guidance in centering the boat on the trailer. As the operator guides the boat between the posts, the posts may also physically aid in centering the boat by forcing the boat toward the center of the trailer if the boat contacts one of the centering guide posts. Most guide posts have some flexibility but also have enough rigidity that the posts will push the still-floating boat toward the center of the trailer.

To provide greater visibility when trailering a boat on a road at night or when loading a boat onto a trailer at night or in low light conditions generally, many guide posts for boat trailers have lights operatively connected to the lighting system of the towing vehicle with a lighting harness that supplies power to all lights on the trailer. However, there are problems with known lighted guide post systems for boat trailers. For instance, on many lighted guide posts, the lights are located only at the top of each post, which may limit visibility between the guide post lights and the trailer tail lights, which may be submerged when loading a boat onto the trailer. This may create problems particularly when loading a boat onto a trailer. Although an experienced boat operator may be able to perform this task in low light conditions when other environmental conditions are favorable, this task may become quite difficult in conditions of high winds, heavy fog, fast-moving currents, and/or muddy water. Guide post lights positioned at the top of the posts may also limit rear visibility for a driver trailering the boat on a roadway at night or other drivers on the roadway at night or in other low visibility conditions.

Although some guide post lighting systems provide some lighting between the upper and lower ends of the guide posts, these systems also have some problems, such as issues relating to Department of Transportation or other regulatory agency rules regarding lighting systems for highway vehicles. For instance, some government agency regulations may control the required color of lights on vehicles and the direction that those lights may face relative to the vehicle. Some known lighted guide post systems may not comply with such regulations or guidelines if those systems have lights of multiple colors due to lights of one color bleeding over to an area of lights of another color. Further, systems utilizing only one color of lights do not provide the benefit of providing different types of information to others through the use of lights of different colors.

Accordingly, there is a need in the art for an improved lighted guide post assembly for a boat trailer that provides lighting throughout the length of each guide post and that may also utilize multiple light colors without the colors bleeding together.

SUMMARY

A lighted guide post assembly for a boat trailer and a method of using and installing the lighted guide post assembly are provided. The assembly comprises an angled support post having a first end section and a second end section positioned at an angle to the first end section. The first end section may be fixedly secured to a support beam of a boat trailer so as to support the second end section in a generally vertical position. The support post has a hollow interior that defines a conduit between two open opposing ends of the support post. The second end section has a squared cross-sectional shape. The assembly further comprises a translucent circular tube disposed around a length of the second end section of the support post. The circular tube functions as one of an opposing pair of visible guide posts. The circular tube is sized to fit over the squared second end section of the support post such that the combination of the circular tube and the squared second end section of the support post form four respective cavities disposed between an exterior of the second end section and an interior of the circular tube on each of four respective sides of the second end section. Each cavity extends lengthwise along a length of the circular tube. The four cavities define a front cavity, a rear cavity, and two opposing side cavities, respectively. The rear cavity faces toward a rear end of the boat trailer when the assembly is installed on the trailer, and the front cavity and side cavities face toward a front end of the boat trailer and sides of the boat trailer, respectively.

A strip of lights is disposed within the rear cavity and extends lengthwise along a length of the rear cavity. In a preferred embodiment, two strips of lights are disposed within the rear cavity with one functioning as running lights for the trailer and the second strip functioning as braking and turn signal lights. In a preferred embodiment, additional strips of lights may be disposed within the front cavity and/or within one or both of the side cavities and extending lengthwise along a length of the translucent circular tube. Wiring is operatively connected to each respective strip of lights and extends through the conduit within the interior of the support post from the open end of the second end section to the open end of the first end section. The wiring may be held in place by a wire retainer at the top end of the second end section of the support post. The wiring may be electrically connected to a lighting system of the boat trailer, which may be connected to a towing vehicle via a wiring harness to provide power to all lights on the trailer, including both the standard rear running lights and brake lights, as well as the light strips of the guide post assembly.

The assembly may include two support posts and two tubes so that one tube may be secured to each respective side of the trailer such that the center of the trailer is at a midpoint between the two tubes. The light strips are preferably LED light strips. The light strips disposed within the rear cavity preferably comprise red lights for braking and turn signal lights, and the light strips disposed within the front cavity and/or side cavities preferably comprise amber lights to indicate to a viewer that the viewer is seeing the front and/or sides of the trailer rather than the back end of the trailer. In a preferred embodiment, the assembly includes three strips of amber lights disposed within the front cavity and the two side cavities, respectively.

To install the guide post assembly, the first end section of the angled support post may be secured to the horizontal support beam of the boat trailer. Wiring to supply power to the light strips may be operably connected to wiring of the trailer's existing lighting system at one end and run through the conduit within the interior of the support post to the second end of the support post, which is at a top end of the support post. Individual wires may be retained at the top end of the support post by the wire retainer. The light strips may then be operably connected to the wiring and allowed to fall downward and suspend on the exterior of the second end section of the support post. The translucent circular tube may then be positioned over the second end section of the support post and over the suspended light strips. The tube may then be lowered down over the second end section of the support post with each light strip positioned within the circular tube on the appropriate side of the squared second end section of the support post. The circular tube may then be capped at its upper end and secured in place to complete the installation.

Once the assembly is installed and the trailer lighting is connected to the tow vehicle via a wiring harness, the lights of the assembly may be controlled by lighting controls inside the tow vehicle. In a preferred embodiment, the assembly provides two strips of red LED lights in the rear cavity, which faces rearward from the boat trailer when the assembly is installed on the trailer. One strip of red lights provides lighting for running lights that remain lighted at all times that the towing vehicle's lights are activated. The second strip of red lights provides brake lights and turn signal lights when the braking or turning signals of the towing vehicle are activated, respectively. The assembly preferably also provides amber lights on the front and two sides of the guide post, which remain lighted whenever the lights of the towing vehicle are activated. The squared support post is constructed of an opaque material with the light strips positioned on one of four sides of the squared tubing. Thus, the cross-sectional geometry of the opaque square support post and the translucent circular tube fitted over the support post prevents light on one side of the square support post to bleed over to any adjacent sides of the circular guide post. The present assembly provides a simple construction that is easy to assemble and that may provide lighting on all four sides of the round guide post that does not bleed together between adjacent sides of the post. Red lights indicate to observers that they are viewing the rear end of the trailer, while amber lights indicate to observers that they are viewing a front side of the guide post or one of the sides of the trailer.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
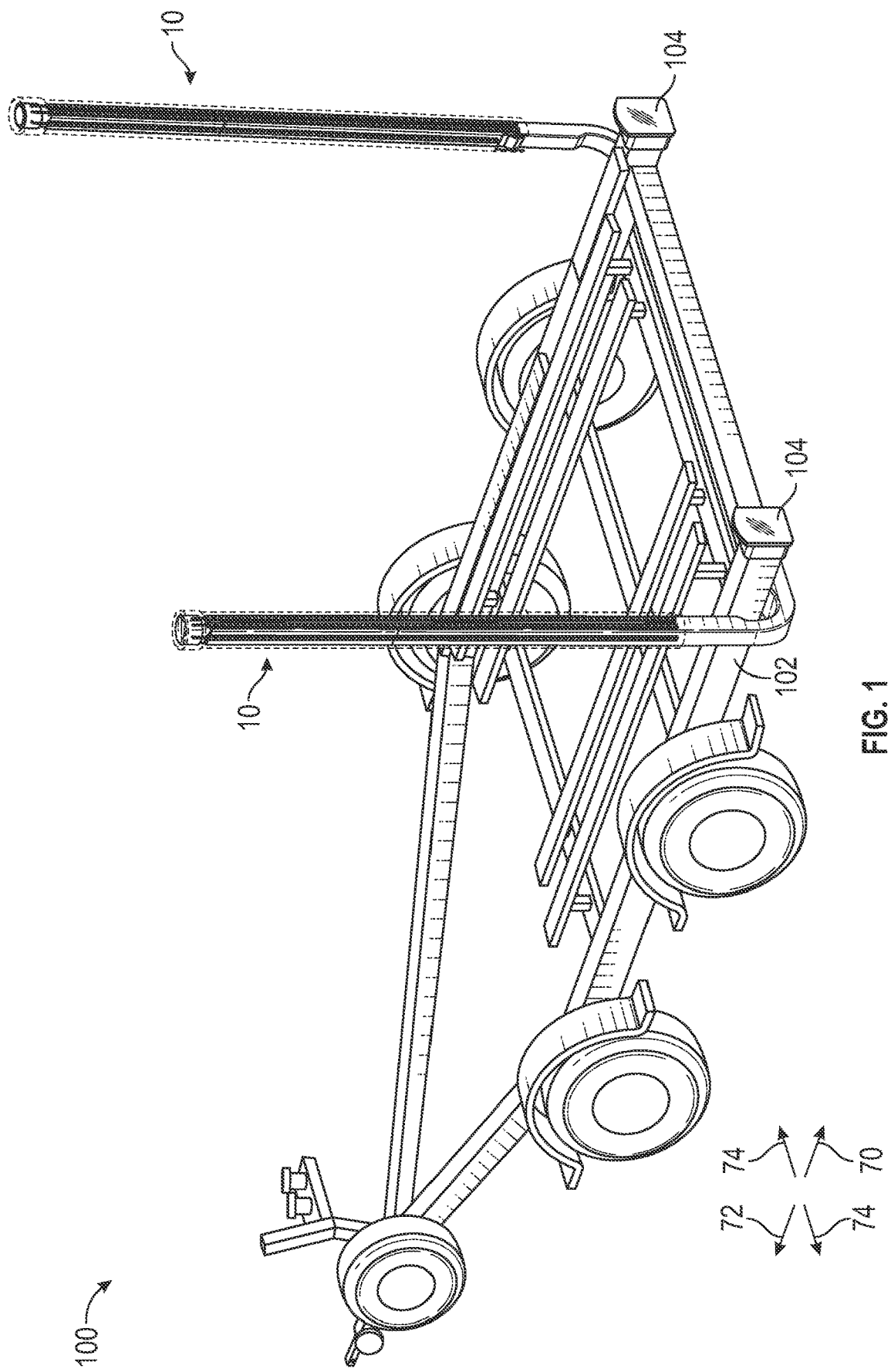
FIG. 1 shows a perspective view of a boat trailer having a lighted guide post assembly a installed thereon in accordance with the present disclosure.
Figure 2:
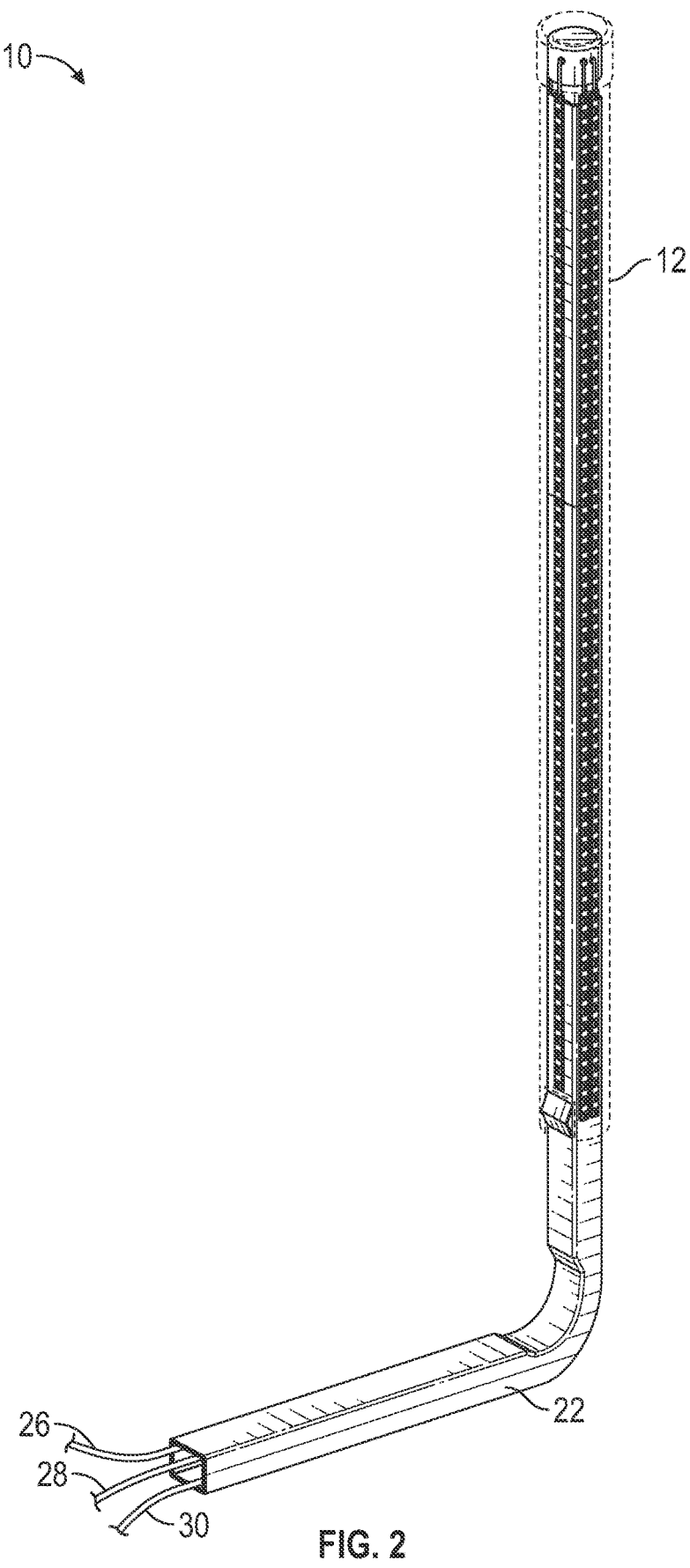
FIG. 2 shows a perspective view of a lighted guide post assembly for a boat trailer in accordance with the present disclosure.
Figure 3:
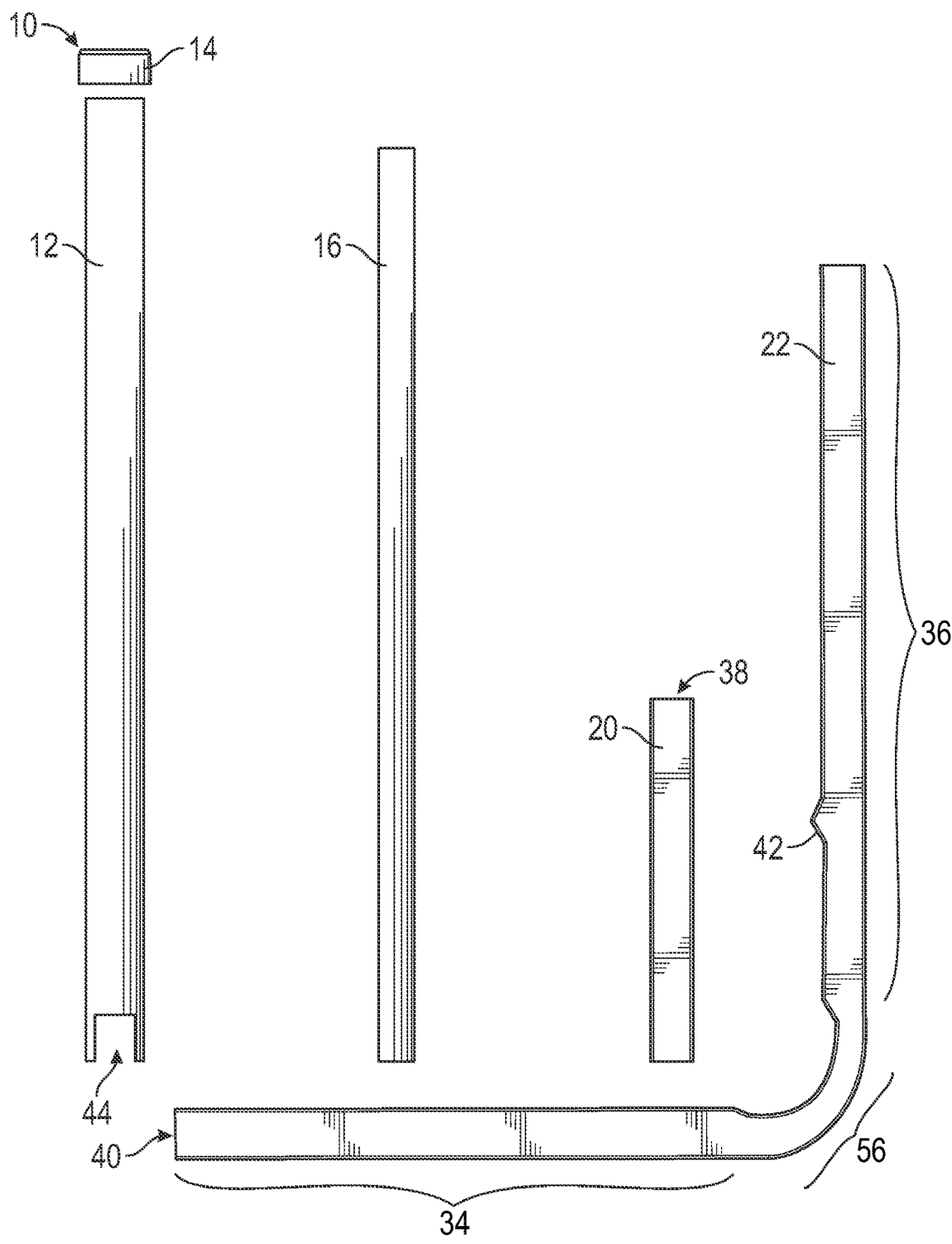
FIG. 3 shows components of a lighted guide post assembly for a boat trailer in accordance with the present disclosure.
Figure 4:
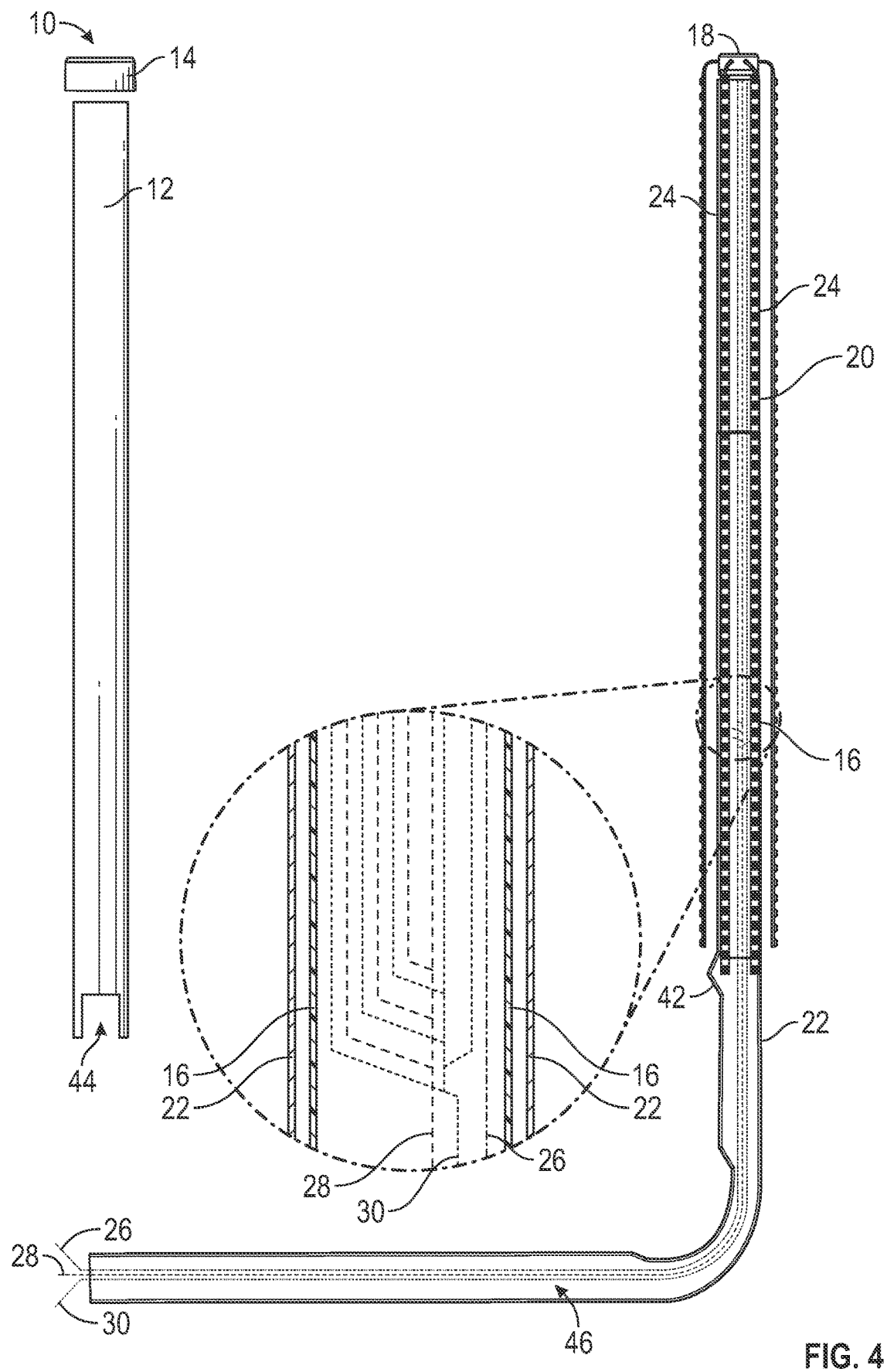
FIG. 4 shows components of a lighted guide post assembly for a boat trailer in accordance with the present disclosure.
Figure 5:
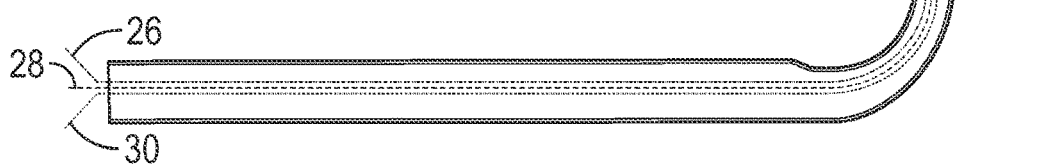
FIG. 5 shows a rear elevational view of an assembled lighted guide post for a boat trailer in accordance with the present disclosure.

A lighted guide post assembly 10 for a boat trailer 100 and a method of using and installing the lighted guide post assembly are provided. FIGS. 1-9 illustrate preferred embodiments of the assembly 10 for use on a trailer 100. FIG. 1 illustrates two assemblies 10 installed on opposing sides of a rearward end 70 of the trailer 100. FIG. 2 illustrates one assembled guide post assembly 10 detached from the trailer 100. FIG. 3 illustrates mounting components for installing the guide post assembly 10. FIGS. 3-5 illustrate one guide post assembly for installation on the right side of a boat trailer as viewed from the rearward end 70 of the trailer 100, though the assembly may include both a left side assembly 10 and a symmetrical right side assembly 10 so that the guide posts may be used to center a boat on the trailer 100.

Figure 7:
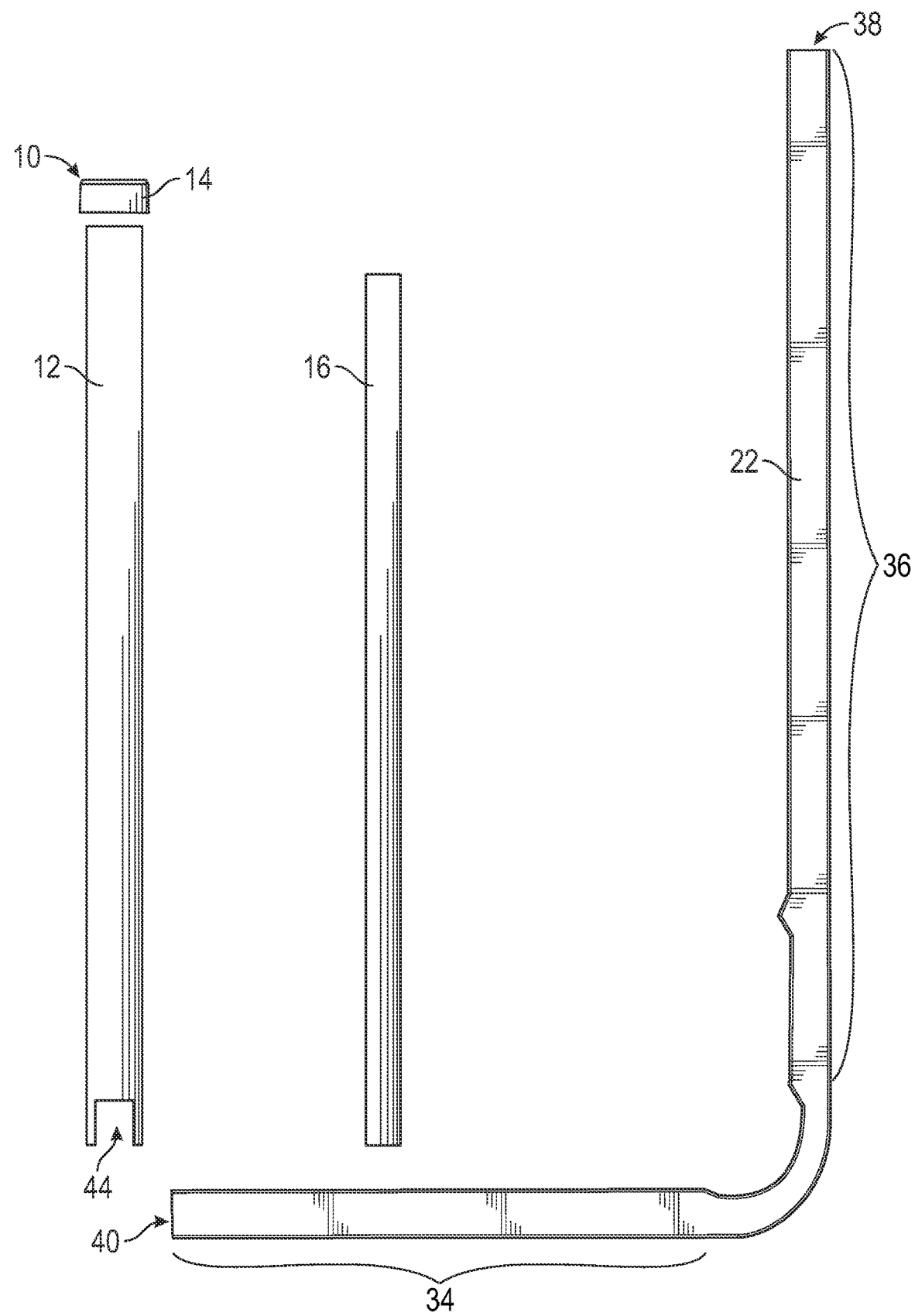
FIG. 7 shows components of a lighted guide post assembly for a boat trailer in accordance with the present disclosure.
Figure 8:
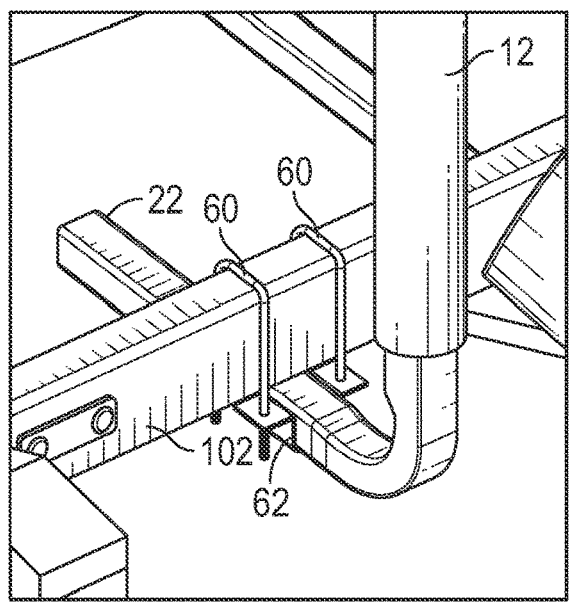
FIG. 8 shows a perspective view of a lighted guide post assembly fastened to a support beam of a boat trailer in accordance with the present disclosure.

In a preferred embodiment, as shown in FIGS. 3 and 7, the assembly 10 comprises an angled support post 22 having a first end section 34 and a second end section 36 positioned at an angle to the first end section 34. The first 34 and second 36 end sections are disposed on opposing ends of an angled section 56 of the support post 22. The first 34 and second 36 end sections are preferably straight lengths of tubing that are open at opposing ends. As best seen in FIGS. 1 and 8, the first end section 34 may be fixedly secured to a horizontal support beam 102 of the boat trailer 100. The assembly 10 may further comprise a fastener configured to fixedly secure the angled support post 22 to the support beam 102 of the boat trailer 100.

Figure 9:
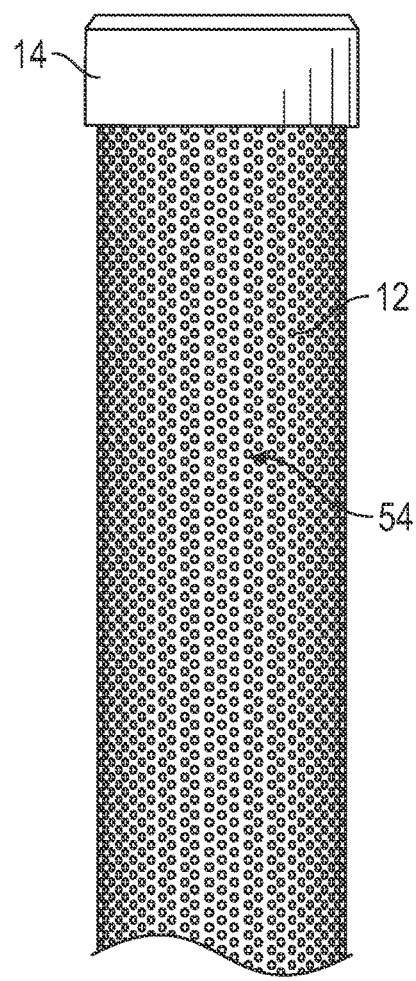
FIG. 9 shows a partial side elevational view of a lighted guide post assembly for a boat trailer in accordance with the present disclosure.

The assembly 10 further comprises a translucent circular tube 12 sized to fit over the second end section 36 of the support post 22. When installed, as shown in FIGS. 2 and 5, the circular tube 12 is disposed around a length of the second end section 36 of the angled support post 22. In a preferred embodiment, the tube 12 is translucent but not transparent. In an alternative embodiment, as shown in FIG. 9, the tube 12 may be a clear transparent tube, which may preferably be covered in a perforated wrap 54. In one embodiment, the tube 12 may be a length of standard polyvinyl chloride (PVC) pipe commonly used in piping applications, which provides sufficient transparency for the present lighting application. The tube 12 functions as the guide post, and PVC construction provides a durable exterior suitable for repeated contact with boats and extended saltwater and UV light exposure while also providing sufficient transparency. The assembly preferably includes a cap 14 sized to fit on the upper end of the tube 12 to prevent water from entering the interior of the tube where electrical wiring and lighting components are housed.

The second end section 36 of the angled support post 22 has a squared cross-sectional shape. In a preferred embodiment, the first end section 34 also has a squared cross-sectional shape. The squared shape of either end section may have rounded corner sections 52. In some embodiment, the squared shape may refer to any shape having four corners, which may include an astroid shape or other shapes having concave sides. The support post 22 is preferably constructed of metal, which is preferably marine grade aluminum or galvanized steel. As best shown in FIG. 3, the angled support post 22 preferably has a rounded 90-degree bend 56, though the angled support post 22 may alternatively have a bend of slightly less than 90 degrees so that the guide posts 12 are angled slightly outward from the trailer 100 or may have a bend that is not rounded. In a preferred embodiment, as shown in FIG. 3, the first end section 34 of the angled support post 22 is in a generally horizontal position when the post 22 is secured to a trailer 100, and the second end section 36 is in a generally vertical position (which may be angled slightly outward) on the opposite side of the angled section 56 of the angled support post 22 from the first end section 34.

All portions of the angled support post 22 have a hollow interior that defines a conduit 46 between two open opposing ends 38 and 40 of the support post 22. As best shown in FIGS. 2 and 4, the conduit 46 allows passage of wiring 26, 28, 30 through the interior of the support post 22. As best seen in FIG. 8, the first end section 34 may be fixedly secured to the boat trailer 100 with U-bolts 60 and corresponding nuts or any similar type of fasteners suitable for securing the support post 22 to a trailer 100. The assembly 10 may include a cradle 62 shaped to fit around the first end section 34 of the support post 22 and having holes therein for attachment to the U-bolts 60. The U-bolts 60 may have a squared shape to conform to the shape of a support beam 102 of a boat trailer 100.

Figure 6:
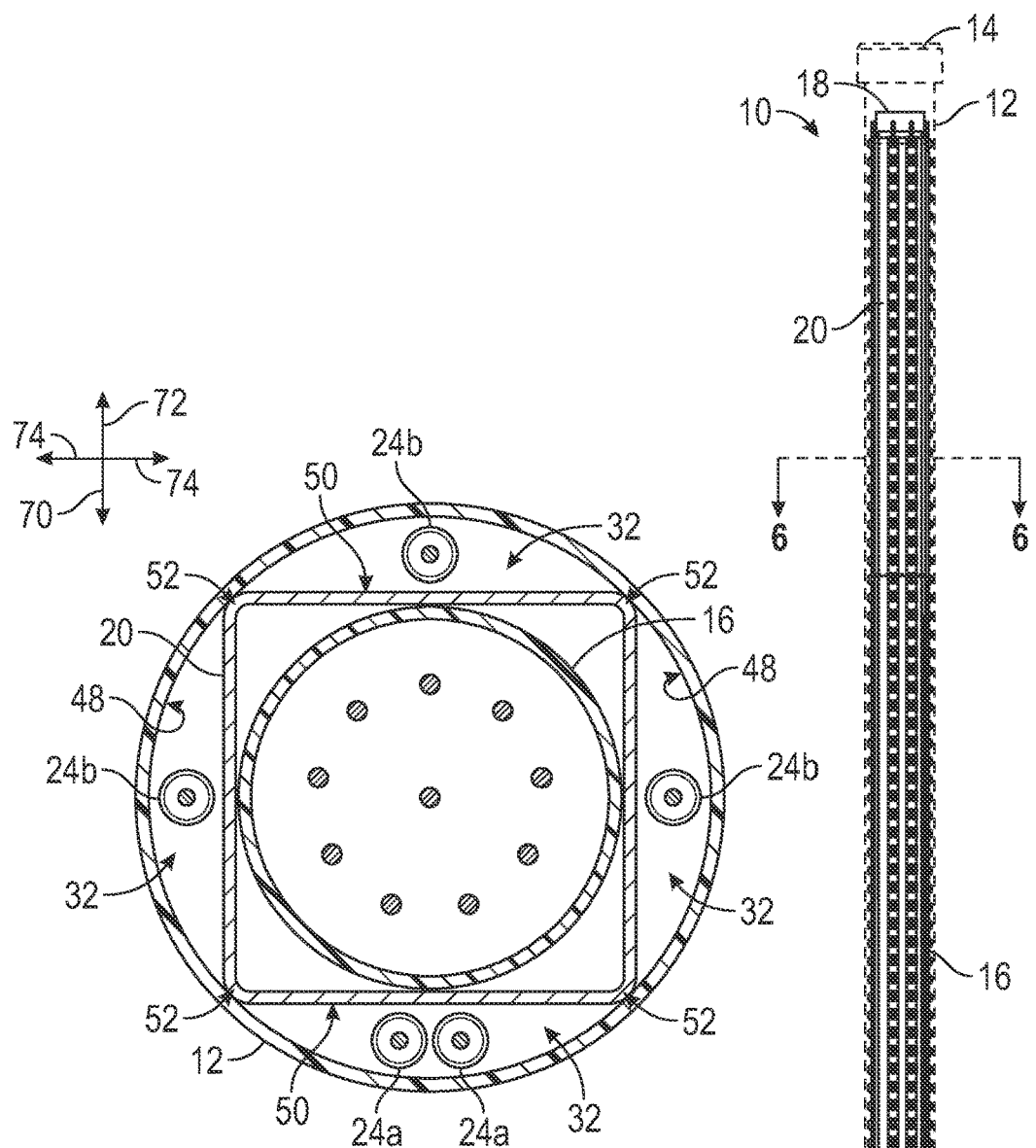
FIG. 6 shows a cross-sectional view of the assembled lighted guide post shown in FIG. 5 in accordance with the present disclosure.

As shown in FIG. 3, the assembly 10 may optionally include a circular interior tube 16 and an extension tube 20. As best seen in FIG. 6, the interior tube 16 has a smaller diameter than the outer tube 12. The extension tube 20 is a length of tubing having a squared cross-sectional shape that conforms to the squared cross-sectional shape of the second end section 36 of the support post 22. The extension tube 20 may function as an extension of the second end section 36 to provide greater support to the outer tube 12 that fits around the second end section 36 of the support post 22. In one embodiment, the optional extension tube 20 may be utilized to retrofit the present assembly 10 for a trailer 100 using an existing commercially available guide post support post 22 in which the second end section 36 of the existing support post 22 does not have sufficient length so that the outer tube 12 is disposed around the second end section 36 along substantially all of the length of the outer tube 12, such as the support post 22 as shown in FIG. 3. The extension tube 20 has a hollow interior and is open at both ends. The extension tube 20 may be axially aligned with the second end section 36 of the support post 22, as best seen in FIGS. 4 and 5. When the extension tube 20 is axially aligned with the second end section 36, the hollow interiors of both the support post 22 and the extension tube 20 collectively define a conduit 46 between a top open end 38 of the extension tube 20 and an opposing open end of the first end section 40 of the support post 22. The second end section 36 of the support post 22 preferably extends to a point near an upper end of the guide post 12 when fully assembled, as shown in FIG. 5. Thus, in one embodiment, as shown in FIG. 7, the support post 22 may be a unitary piece of material in which the second end section 36 extends to the desired height. In another embodiment, as shown in FIGS. 3-5, a support post 22 having a shorter second end section 36 may be utilized in combination with the extension tube 20 so that the combination of post 22 and extension tube 20 extend to the desired height. Thus, the top end 38 of the support post 22 may be defined by the top end 38 of the second end section 36 of the angled support post 22 itself, as indicated in FIG. 7, or the top end 38 of the extension tube 20, as indicated in FIG. 3.

The optional interior tube 16 is sized to fit inside the optional extension tube 20 and inside the squared tubular second end section 36 of the support post 22, as shown in FIGS. 2-4. Use of the interior tube 16 may be preferred when utilizing the extension tube 20 as the interior tube 16 provides internal support for holding the extension tube 20 in place and in alignment with the second end section 36 of the support post 22 when installing the assembly. The circular interior tube 16 is preferably sized such that an exterior surface of the interior tube 16 contacts four interior walls of the extension tube 20 and of the second end section 36 of the angled support post 22 along a length of the extension tube 20 and the second end section 36, as shown in FIG. 6.

In a preferred embodiment, the assembly 10 further comprises a wire retainer 18 positioned at a top end 38 of the second end section 36 of the support post 22. In another preferred embodiment, as best seen in FIG. 4, the wire retainer 18 may be positioned at a top end 38 of the extension tube 20, which extends the second end section 36 of the support post 22 and thus defines the top end 38 of the second end section 36 in embodiments utilizing the extension tube 20. The wire retainer 18 may be utilized to retain wiring 26, 28, 30 at the top open end 38 of the support post 22.

The outer translucent circular tube 12 is sized to fit over the squared second end section 36 of the support post 22 such that the combination of the circular tube 12 and the squared second end section 36 of the support post 22 form four respective cavities 32 disposed between an exterior 50 of the second end section 36 and an interior 48 of the circular tube 12 on each of four respective sides of the second end section 36, as best seen in FIG. 6. Each cavity 32 extends lengthwise along a length of the circular tube 12 generally from the top end 38 of the second end section 36 or from the top end 38 of the extension tube 20 to a lower end 44 of the tube 12. The four cavities 32 define a front 72 cavity, a rear 70 cavity, and two opposing side 74 cavities, respectively. In a preferred embodiment, as shown in FIG. 6, the circular tube 12 is sized such that the interior surface 48 of the circular tube 12 contacts four corner sections 52 of the second end section 36 of the angled support post 22 along a length of the second end section 36. In embodiments including the extension tube 20, the interior surface 48 of the circular tube 12 may also contact four corner sections 52 of the extension tube 20 that is aligned with the second end section 36. The corner sections 52 of the second end section 36 and the extension tube 20 are preferably rounded, as best seen in FIG. 6, for ease of installing the outer tube 12 over the second end section 36 and extension tube 20 and to facilitate a tight fit between the outer tube 12 and the second end section 36 and extension tube 20.

The assembly 10 further comprises a strip of lights 24a disposed within the rear cavity 32 and extending lengthwise along a length of the rear cavity 32 within the outer tube 12. In a preferred embodiment, the assembly 10 further comprises a second strip of lights 24a disposed within the rear cavity 32 parallel to the first strip of lights. In another preferred embodiment, the assembly 10 further comprises a strip of lights 24b disposed within the front cavity 32 or within one of the side cavities 32 and extending lengthwise internally along a length of the circular tube 12. In another preferred embodiment, as shown in FIG. 6, the assembly 10 comprises two strips of lights 24a disposed within the rear cavity 32 and one respective strip of lights 24b in each of the front cavity 32 and the two opposing side cavities 32. It should be understood by one of skill in the art that various arrangements of lighting strips 24 disposed within different combinations of cavities 32 may be utilized and still fall within the scope of the present disclosure. In a preferred embodiment, the light strips 24a disposed within the rear cavity 32 comprise red lights, and the light strips 24b disposed within any of the front and side cavities 32 comprise amber lights. Because the lighting strips 24 extend along the length of the guide posts 12 to the upper end of each post, the wire retainer 18 may be utilized to retain the wiring 26, 28, 30 near the upper end of each guide post, as best seen in FIG. 4.

The lighting strips 24 are positioned exterior to the interior tube 16, so it is not required that the interior tube 16 be translucent. In one embodiment, the interior tube 16 may comprise a length of PVC pipe. In a preferred embodiment, the assembly 10 further comprises a cap 18 designed to function as the wire retainer that is positioned at the top end 38 of the extension tube 20 or second end section 36 of the support post 22. The cap 18 is sized to cap an upper end of the interior tube 16 and to fit within an interior diameter of the translucent outer tube 12, as best seen in FIGS. 2 and 5. In an alternative embodiment, instead of a PVC piping cap, the wire retainer may comprise a retaining piece attached to, molded with or otherwise integrally formed with the interior tube 16, or alternatively with the second end section 36 or with the extension tube 20. For instance, in an embodiment utilizing a unitary angled support post 22 without an extension 20, as shown in FIG. 7, the wire retainer may comprise a retaining piece welded to or otherwise integrally formed with the post 22 at the top end 38 of the second end section 36. In each of these embodiments, the outer tube 12 will cover the second end section 36 of the support post 22, and the cap 14 of the outer tube 12 will enclose the interior of the guide post 12 to protect and waterproof all internal lighting 24 and wiring 26, 28, 30 components.

Figure 3A:
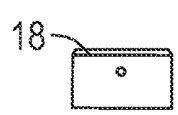
FIG. 3A shows a component of a lighted guide post assembly for a boat trailer in accordance with the present disclosure.
Figure 3B:
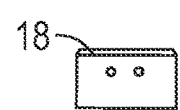
FIG. 3B shows a component of a lighted guide post assembly for a boat trailer in accordance with the present disclosure.
Figure 3C:
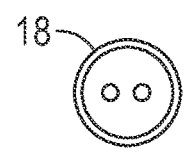
FIG. 3C shows a component of a lighted guide post assembly for a boat trailer in accordance with the present disclosure.

FIG. 3A shows a front 72 view of the cap 18 preferably utilized to cover the interior tube 16. The cap 18 preferably has a single small opening sized to run wiring 28, 30 for one strip of lights 24b through the opening, which is preferably a strip of amber lights. FIG. 3B shows a rear 70 view of the cap 18, which preferably has a pair of small openings sized to run wiring 26, 28, 30 for one of two strips of lights 24a through each respective opening, which are preferably both strips of red lights, including one strip for running lights and one strip for braking and turn signal lights. Alternatively, a single strip of lights 24a may be utilized for both running lights and braking and turn signal lights, though two strips 24a may be preferred so that the assembly 10 is compatible with existing boat trailer 100 lighting systems, which typically use separate lights for running lights and for braking and turn signal lights. In a preferred embodiment, the cap 18 preferably also has a single small opening on each respective side 74 of the cap for wiring 28, 30 for one strip of lights 24b, which are preferably amber lights. FIG. 3C shows the top of the cap 18, which may optionally have a pair of small openings for a separate optional light (not shown) positioned on top of each of the guide posts 12. In this optional embodiment, the cap 14 for the translucent outer tube 12 may be replaced with a separate cap light assembly that fits onto the top end of the outer tube 12 and functions as both a light and as a cap 14 for the outer tube 12 for waterproofing the interior of the guide post.

The assembly further comprises wiring 26, 28, 30 operatively connected to each respective strip of lights 24. The wiring 26, 28, 30 extends through the conduit 46 within the interior of the support post 22 (and optionally the extension tube 20) from the upper open end 38 of the second end section 36 or extension tube 20 to the open end 40 of the first end section 34 of the support post 22. The wiring 26, 28, 30 provides power to all light strips 24 in a respective one of the guide post assemblies 10. The wires 26, 28, 30 are preferably 14-gauge waterproof wire approximately ten feet long for each guide post assembly 10. In a preferred embodiment, as best seen in FIGS. 2 and 4, the wiring comprises three wires with ends positioned at the open end 40 of the first end section 34 of the support post 22. The three wires include one wire 26 for the brake light and turn signal lights, which are operated by one light strip 24a in the rear cavity 32, one wire 28 for all running lights, including both red 24a and amber 24b running lights, and one return wire 30, or ground wire, for all light strips 24a and 24b, which may preferably include two red light strips 24a and three amber light strips 24b.

As shown in FIG. 4, these three wires preferably branch into ten separate wires for the functioning of all light strips 24. FIG. 4 illustrates a preferred embodiment of the guide post assembly 10 having a total of five light strips 24, including two red light strips 24a and three amber light strips 24b on the front side 72 of the guide post 12 and the two opposing sides 74, respectively, of the guide post 12 between the front 72 and rear 74 sides. The return wire 30 preferably branches into five wires providing a return path for electric current for each of the five light strips 24. The running lights wire 28 preferably branches into four wires for providing electrical power to each of the three amber light strips 24b and to one red light strip 24a that provides rear 70 running lights. The brake and turn signal lights wire 26 preferably does not branch into other wires as it provides electrical power only to the red light strip 24a that provides braking and turn signal lighting. The close up view of FIG. 4 illustrates a schematic of the wiring 26, 28, 30 within the interior of the support post 22. Any suitable type of electrical wiring connectors may be utilized to form branches as indicated in FIG. 4 and insulate individual wires. As best seen in FIG. 4, all wires for supplying electrical power extend through the support post 22 and the optional extension tube 20 to the top end 38 of the support post 22, at which point the wires 26, 28, 30 may be retained in place by the wire retainer 18. Each of the wires passes through one of the openings in the cap 18 to retain the wires in place. The light strips 24 are each operably connected to the corresponding wires and then allowed to suspend downward from the wire retainer 18, as shown in FIG. 4, which shows the suspended light strips 24 before installation of the outer translucent tube 12. The light strips 24 are preferably each 12V direct current waterproof light strips including 22-gauge wire.

To install the guide post assembly 10, the first end section 34 of the angled support post 22 is fastened to a support beam 102 the boat trailer 100 with fasteners such as U-bolts 60. The first end section 34 is preferably in a generally horizontal position relative to the ground on which the trailer 100 rests. In embodiments utilizing the optional extension tube 20, the extension tube 20 is placed in an axially aligned position with the second end section 36 of the support post 22. The optional interior tube 16 may then be inserted downward through the extension tube 20 and into the second end section 36 of the support post 22, as shown in FIG. 4. The support post 22 may have a stopper within the interior conduit 46 of the post to stop the interior tube 16 at the appropriate location within the support post. The extension tube 20 extends the length of the second end section 36 of the support post 22 so that the wire retainer 18 may be positioned at the top end 38 of the second end section 36 of the support post 22 and also just below the cap 14 of the translucent outer tube 12, as shown in FIG. 5. The interior tube 16 functions to provide internal stability to the extension tube 20 to hold the extension tube in a fixed position relative to the support post 22 and also to protect the wiring 26, 28, 30. The interior tube 16 may also be utilized in embodiments not utilizing the extension tube 20 in order to provide an attachment point for the wire retainer 18, which is preferably an end cap sized to cap the interior tube 20, and to protect the internal wiring 26, 28, 30, which preferably extends through the interior of the interior tube 16.

All of the wiring 26, 28, 30 may then be inserted through the top open end 38 of the support post 22 and also through a top open end of the interior tube 16 that has been inserted into the support post 22. The wiring 26, 28, 30 is inserted through the entire length of both end section 34 and 36 of the support post 22 so that ends of the brake and signal light wire 26, the running light wire 28, and the return wire 30 are positioned at the open end 40 of the first end section 34 of the support post 22, as shown in FIGS. 2 and 4. Opposing ends of the wires 26, 28, 30 for connection to the lighting strips 24 are positioned at the top end 38 of the support post 22. The wires at the top end 38 may then be inserted through the respective corresponding openings in the wire retainer 18. Preferably, each opening corresponds to one lighting strip 24 and is thus sized so that two wires for each strip may pass through the opening. Each opening is also preferably sized so that the two wires passing through the opening fit snugly within the opening so that the opening functions to retain the wires in place and protect the wiring from abrasions. The cap 18 may then be used to cap the upper open end of the interior tube 16 in order to hold the cap/wire retainer 18 in place. Each lighting strip 24 may then be operably connected to the corresponding wires 26, 28, 30. The light strips 24 are then allowed to fall downward and suspend along the exterior of the second end section 36 of the support post 22 and optional extension tube 20, as shown in FIG. 4.

The translucent circular tube 12 may then be positioned over the support post 22, extension tube 20, interior tube 16, and the suspended light strips 24 and lowered down over the second end section 36 of the support post 22 with each light strip 24 positioned on the appropriate one of the four sides of the second end section 36 and extension tube 20, as best seen in FIGS. 2 and 5. In a preferred embodiment, as best seen in FIG. 3, the support post 22 may have a protrusion 42 and the outer tube 12 may have a corresponding groove or notch at the bottom end 44 of the tube 12 that fits around the protrusion 42 when the outer tube 12 is installed onto the support post 22 to ensure that the outer tube 12 remains in place after installation and does not rotate on the support post 22. The cap 14 may then be placed onto the top end of the outer tube 12 to cap the tube. The brake and turn signal light wire 26, the running light wire 28, and the ground wire 30 may then be connected to the existing lighting system of the trailer 100 to complete the installation. The trailer 100 lighting system provides power to the standard rear running and brake lights 104, which are powered via wiring typically mounted on the inside of trailer support beams 102. The existing trailer wiring runs to a front 72 end of the trailer 100 where it terminates at a wiring harness, which can be connected to a wiring harness of the tow vehicle to provide electrical power and controls of the trailer 100 lighting via a power source and controls of the tow vehicle. Thus, once the assembly 10 is fully installed on the trailer 100, the amber 24b and red 24a running lights will illuminate when the towing vehicle's running lights are activated, and the red brake/signal lights 24a will illuminate when the towing vehicle's brakes are applied or when the turn signals or hazard lights are used by the operator of the vehicle. It should be understood that the installation steps described herein may be performed in the order described or in any other suitable order. For instance, the angled support post 22 may be fastened to the boat trailer 100 before or after running all of the wiring through the support post 22 and before or after installing the other structural components, including the extension tube 20, the interior tube 16, and the translucent outer tube 12.

As seen in FIG. 8, the first end section 34 of the support post 22 may extend to an interior side of the trailer support beam 102 when the post 22 is fastened to the support beam 102. For ease of connecting the assembly 10 wiring 26, 28, 30 to existing wiring of the trailer 100 for lighting control, an opening (not shown) may be formed on a top side of the first end section 34 directly adjacent to the support beam 102 of the trailer 100 to limit the distance that the wiring 26, 28, 30 must be run to make the connection. In this case, the opening on the top side of the first end section 34 may function as the open end 40 of the first end section 34.

FIG. 6 illustrates a cross-sectional view of the assembly 10 once completely assembled. As shown in FIG. 6, once assembled, the combination of the squared second end section 36 of the post 22 (including the extension tube 20) and the translucent outer tube 12 form four respective cavities 32 on the four sides of the support post 22 with each cavity 32 extending lengthwise along substantially the entire length of the outer tube 12. The four cavities 32 define a front 72 cavity, a rear 70 cavity, and two side 74 cavities relative to the boat trailer 100, as indicated by the arrows shown in FIGS. 1 and 6, when the support post 22 is secured to the boat trailer 100. As best seen in FIG. 6, two strips 24a of red LED lights are preferably disposed within the rear cavity and, in a preferred embodiment, one strip 24b of amber LED lights is disposed within each of the front cavity and the two side cavities, respectively. The cavities 32 housing the lighting strips 24 each generally extend from the wire retainer 18 down lengthwise along substantially the entire length of the translucent outer tube 12 so that the tube 12 glows along substantially the length of the entire tube 12 when the lighting is activated.

As best seen in FIG. 6, the second end section 36 of the support post 22 (and extension tube 20 having the same cross-sectional shape and dimensions as the second end section 36 of the post 22), the interior tube 16, and the translucent outer tube 12 are all sized so that these components all fit together snugly so that these components provide support and stability to the overall assembly 10 and prevent the interior tube 16 and extension tube 20 from rotating relative to the other structural components. FIG. 7 illustrates the mounting hardware utilizing a unitary support post 22 without an extension tube 20, which preferably has the same cross-sectional geometry as shown in FIG. 6, and which preferably also utilizes an interior tube 16. In one preferred embodiment, the outer tube 12 may be 2-inch diameter PVC pipe, the interior tube 16 may be 1¼ inch PVC pipe, and the second end section 36 of the support post 22 and the extension tube 20 may comprise 1½ inch diameter steel square tubing. In this configuration, as shown in FIG. 6, each light strip 24 is positioned within a respective cavity 32 between the translucent outer tube 12 and the opaque second end section 36 of the support post 22 and the optional extension tube 20, which is also opaque. The squared extension tube 20 is installed such that the four corners 52 of the extension tube 20 contact and are aligned with the four corners of the support post 22. Thus, when installed, a flat side of a combination of the extension tube 20 and second end section 36 is facing in a rearward 70 direction, a forward 72 direction, and laterally in a side direction 74 on two opposing sides of the post 22, respectively, relative to the trailer 100 on which the assembly 10 is installed. Because of the positioning of the light strips 24 within the lengthwise cavities 32 and the opaque material of the extension tube 20 and support post 22, the combination extension 20 and post 22 blocks out light from adjacent sides, thereby preventing light from bleeding over into adjacent lights and allowing the light strips 24 to emit a well-defined glow on each respective side 70, 72, 74 of the tube 12. Thus, the amber side 74 lights and rear 70 red lights do not bleed together. Thus, the present assembly 10 provides a simple construction that is easy to assemble and that may provide lighting on all four sides of the round guide post 12 that does not bleed together. Red lights 24a on the rear side of the guide post 12 indicate to observers that they are viewing the rear 70 end of the trailer 100, while amber lights 24b indicate to observers that they are viewing a front 72 side of the guide post 12 or one of the sides 74 of the guide post 12 that face in a transverse direction relative to the trailer 100. The assembly 10 may comprise a kit having all of the components necessary to install the lighted guide posts onto a trailer, or may optionally include only those components necessary for retrofitting the assembly to a trailer already having guide posts, which may thereby utilize parts of an existing set of guide posts, such as the support post securing the guide posts to the trailer. The length of the second end section 36 of the support post 22, the extension tube 20, the interior tube 16, and/or the outer tube 12 may be varied to provide a guide post of any desired height, which may depend on the size of the boat being trailered.

Figure 10:
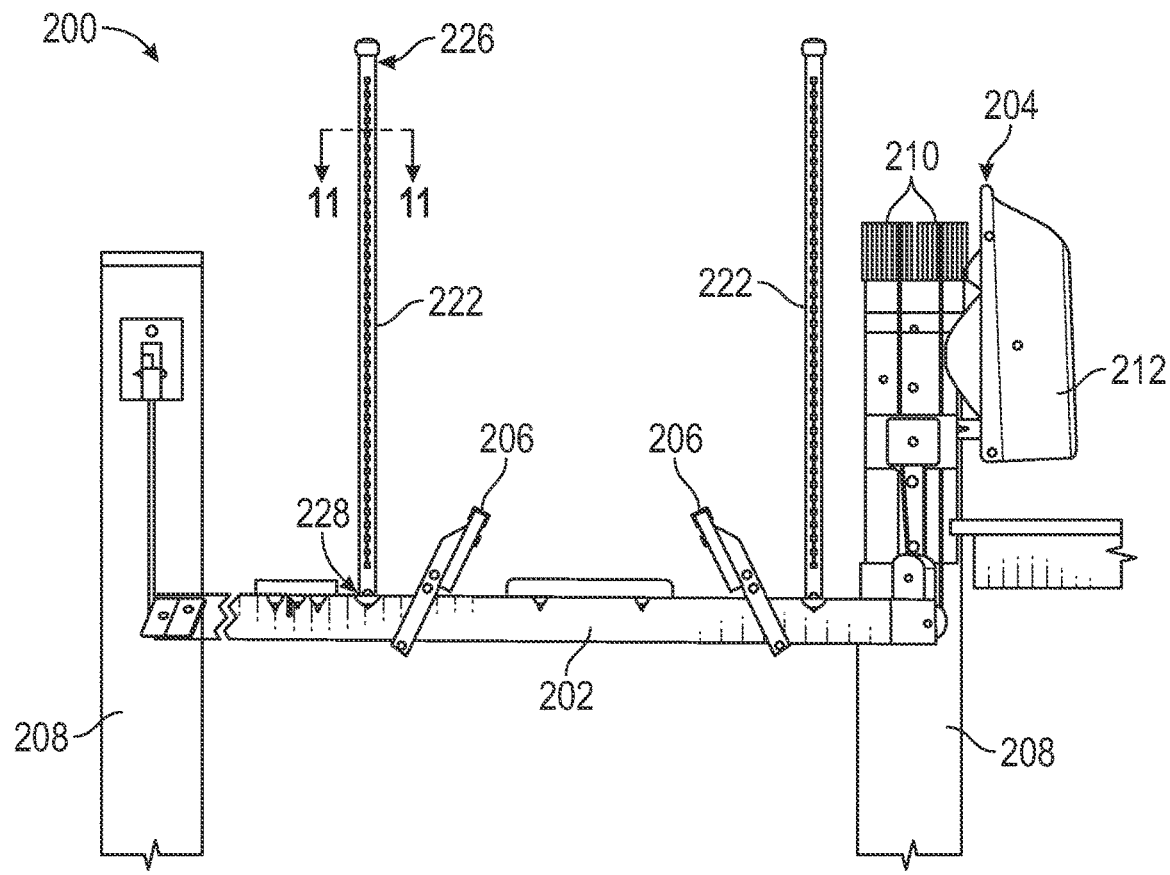
FIG. 10 shows an elevational view of a boat lift having a lighted guide post assembly installed thereon in accordance with the present disclosure.

In an alternative embodiment, as shown in FIG. 10, the guide post assembly 10 may be configured for use on a boat lift 200 rather than on a trailer 100. The boat lift 200 may be a pile mount lift, as shown in FIG. 10, or any similar type of boat lift, such as a lift suspended from an overhead structure. The lift 200 may comprise horizontal support beams 202 operatively connected to a hoist 204 that is configured to lift and lower the support beams 202. The hoist 204 may be secured to pilings 208 over water and may include a gearbox 212 and spools 210 of cable with pulleys configured to lift the support beams 202. A plurality of bunks 206 configured to support the hull of a boat may be attached to the support beams 202 in a position transverse to the support beams 202. The guide post assembly 10 may be attached to one or more of the support beams 202 to guide an operator of the boat to a centered position of the beams 202 so that the boat is properly positioned on the bunks 206 when the lift 200 is used to lift the boat out of the water.

Figure 11:
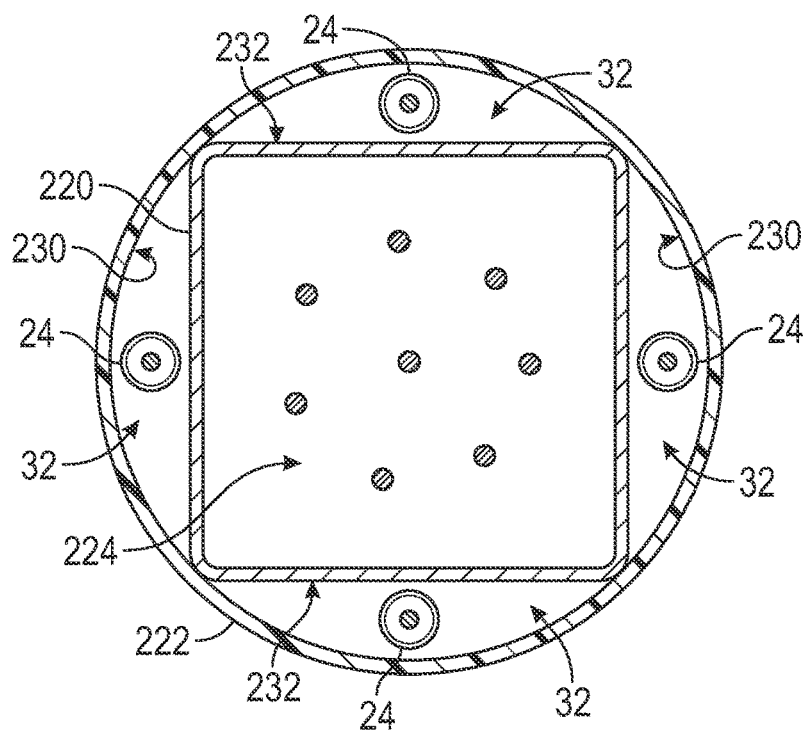
FIG. 11 shows a cross-sectional view of the lighted guide post shown in FIG. 10 in accordance with the present disclosure.

In this embodiment, the guide post assembly 10 comprises a vertical support post 220 configured to attach to the horizontal support beam 202 at one end of the support post 220 such that the support post 220 extends upwardly from the horizontal support beam 202. The assembly may include a bracket configured to fasten the support post 220 to the support beam 202 and support the post 220 in the vertical position. The support post 220 has a hollow interior that defines a conduit 224 between an upper open end 226 and a lower open end 228 of the support post 220. The support post 220 has a squared cross-sectional shape, as shown in FIG. 11. The assembly 10 further comprises a translucent circular tube 222 disposed around a length of the support post 220. The circular tube 222 is sized to fit over the squared support post 220 such that the combination of the circular tube 222 and the squared support post 220 form four respective cavities 32 disposed between an exterior 232 of the support post 220 and an interior 230 of the circular tube 222 on each of four respective sides of the support post 220, as shown in FIG. 11. Each cavity 32 extends lengthwise along a length of the support post 220. The four cavities define a front cavity, a rear cavity, and two opposing side cavities, respectively. A strip of lights 24 is disposed at least within the rear cavity in order to guide an operator of a boat when maneuvering the boat onto the lift 200. In a preferred embodiment, as shown in FIG. 11, each of the four cavities 32 has a strip of lights 24 disposed therein. Because the boat lift 200 does not involve trailering a boat on a roadway, the light strips 24 may be of any desired color. Wiring is operatively connected to each respective strip of lights 24 for providing power to the lights. The wiring extends through the conduit 224 within the interior of the support post 220 from the upper open end 226 to the lower open end 228 of the support post 220. The wiring may then be run along the support beam 202 to a power source attached to the pilings 208, to a dock, or on adjacent land.

In a preferred embodiment, the circular tube 222 is sized such that an interior surface 230 of the circular tube 222 contacts four corner sections of the support post 220 along a length of the support post 220, as shown in FIG. 11. An interior tube 16 and/or wire retainer 18 positioned at the upper end 226 of the support post 220 may optionally be utilized.

It is understood that versions of the present disclosure may come in different forms and embodiments. Additionally, it is understood that one of skill in the art would appreciate these various forms and embodiments as falling within the scope of the invention as disclosed herein.

What is claimed is:

1. A guide post assembly, comprising:
    an angled support post having a first end section and a second end section positioned at an angle to the first end section, wherein the support post has a hollow interior that defines a conduit between two open opposing ends of the support post, wherein the second end section has a squared cross-sectional shape,
    a translucent circular tube disposed around a length of the second end section of the angled support post, wherein the circular tube is sized to fit over the squared second end section of the support post such that the combination of the circular tube and the squared second end section of the support post form four respective cavities disposed between an exterior of the second end section and an interior of the circular tube on each of four respective sides of the second end section, wherein each cavity extends lengthwise along a length of the circular tube, wherein the four cavities define a front cavity, a rear cavity, and two opposing side cavities, respectively,
    a strip of lights disposed within the rear cavity and extending lengthwise along a length of the rear cavity,
    wiring operatively connected to the strip of lights, wherein the wiring extends through the conduit within the interior of the support post from the open end of the second end section to the open end of the first end section, and
    a wire retainer positioned at a top end of the second end section of the support post, wherein the wire retainer retains the wiring at the top end of the second end section.

2. The guide post assembly of claim 1, further comprising a second strip of lights disposed within the front cavity or within one of the side cavities and extending lengthwise along a length of the circular tube.

3. The guide post assembly of claim 2, wherein the first strip of lights comprises red lights, and wherein the second strip of lights comprises amber lights.

4. The guide post assembly of claim 1, further comprising a second strip of lights disposed within the rear cavity parallel to the first strip of lights, wherein the first and second strips of light each comprise red lights.

5. The guide post assembly of claim 4, further comprising a third strip of lights disposed within the front cavity or within one of the side cavities and extending lengthwise along a length of the circular tube, wherein the third strip of lights comprises amber lights.

6. The guide post assembly of claim 1, further comprising a fastener configured to fixedly secure the first end section of the angled support post to a support beam of a boat trailer.

7. The guide post assembly of claim 1, wherein the circular tube is sized such that an interior surface of the circular tube contacts four corner sections of the second end section of the angled support post along a length of the second end section.

8. A guide post assembly, comprising:
    an angled support post having a first end section and a second end section positioned at an angle to the first end section, wherein the second end section has a squared cross-sectional shape,
    an extension tube axially aligned with the second end section of the support post, wherein the extension tube has a squared cross-sectional shape that conforms to the squared cross-sectional shape of the second end section, wherein the support post and the extension tube have hollow interiors that collectively define a conduit between a top open end of the extension tube and an opposing open end of the first end section of the support post,
    a circular interior tube axially disposed within the interior of the extension tube and the interior of the second end section of the support post,
    a translucent circular outer tube disposed around a length of the second end section of the angled support post and around the extension tube, wherein the circular outer tube is sized to fit over the squared second end section of the support post and over the squared extension tube such that the combination of the circular outer tube, the squared second end section of the support post, and the squared extension tube form four respective cavities disposed between an interior of the circular outer tube and an exterior of both the second end section and the aligned extension tube on each of four respective sides of the second end section and the extension tube, wherein each cavity extends lengthwise along a length of the circular outer tube, wherein the four cavities define a front cavity, a rear cavity, and two opposing side cavities, respectively,
    a strip of lights disposed within the rear cavity and extending lengthwise along a length of the rear cavity, and
    wiring operatively connected to the strip of lights, wherein the wiring extends through the conduit within the interior of the support post and the extension tube from the top open end of the extension tube to the open end of the first end section of the support post.

9. The guide post assembly of claim 8, wherein the circular interior tube is sized such that an exterior surface of the interior tube contacts four interior walls of the extension tube and of the second end section of the angled support post along a length of the extension tube and the second end section.

10. The guide post assembly of claim 8, further comprising a second strip of lights disposed within the front cavity or within one of the side cavities and extending lengthwise along a length of the circular tube.

11. The guide post assembly of claim 10, wherein the first strip of lights comprises red lights, and wherein the second strip of lights comprises amber lights.

12. The guide post assembly of claim 8, further comprising a second strip of lights disposed within the rear cavity parallel to the first strip of lights, wherein the first and second strips of light each comprise red lights.

13. The guide post assembly of claim 12, further comprising a third strip of lights disposed within the front cavity or within one of the side cavities and extending lengthwise along a length of the circular tube, wherein the third strip of lights comprises amber lights.

14. The guide post assembly of claim 8, further comprising a fastener configured to fixedly secure the first end section of the angled support post to a support beam of a boat trailer.

15. The guide post assembly of claim 8, wherein the circular tube is sized such that an interior surface of the circular tube contacts four corner sections of the second end section of the angled support post along a length of the second end section and four corner sections of the extension tube along a length of the extension tube.

16. The guide post assembly of claim 8, further comprising a wire retainer positioned at a top end of the second end section of the support post, wherein the wire retainer retains the wiring at the top end of the second end section.

17. A guide post assembly, comprising:
   a vertical support post configured to attach to a horizontal support beam at one end of the support post such that the support post extends upwardly from the horizontal support beam, wherein the support post has a hollow interior that defines a conduit between an upper open end and a lower open end of the support post, wherein the support post has a squared cross-sectional shape,
   a translucent circular tube disposed around a length of the support post, wherein the circular tube is sized to fit over the squared support post such that the combination of the circular tube and the squared support post form four respective cavities disposed between an exterior of the support post and an interior of the circular tube on each of four respective sides of the support post, wherein each cavity extends lengthwise along a length of the support post, wherein the four cavities define a front cavity, a rear cavity, and two opposing side cavities, respectively,
   a strip of lights disposed within the rear cavity and extending lengthwise along a length of the rear cavity,
   wiring operatively connected to the strip of lights, wherein the wiring extends through the conduit within the interior of the support post from the upper open end to the lower open end of the support post, and
   a wire retainer positioned at a top end of the second end section of the support post, wherein the wire retainer retains the wiring at the top end of the second end section.

18. The guide post assembly of claim 17, further comprising a second strip of lights disposed within at least one of the front cavity and the two opposing side cavities and extending lengthwise along a length of the circular tube.

19. The guide post assembly of claim 17, wherein the circular tube is sized such that an interior surface of the circular tube contacts four corner sections of the support post along a length of the support post.

\* \* \* \* \*